(12) United States Patent  (10) Patent No.: US 9,034,080 B2
Briglia et al.  (45) Date of Patent: May 19, 2015

(54) METHOD AND DEVICE FOR PRODUCING A FLUID ENRICHED WITH CARBON DIOXIDE FROM A WASTE GAS OF A FERROUS-METALLURGY UNIT

(75) Inventors: Alain Briglia, Corze (FR); Christophe Szamleski, Combs la Ville (FR); Olivier De Cayeux, Nogent sur Marne (FR); Richard Dubettier-Grenier, La Varenne Saint Hilaire (FR); Alain Guillard, Paris (FR); Xavier Traversac, Paris (FR)

(73) Assignee: L'Air Liquide Société Anonyme pour l'Etude et l'Exploitation des Procédés Georges Claude, Paris (FR)

(*) Notice: Subject to any disclaimer, the term of this patent is extended or adjusted under 35 U.S.C. 154(b) by 163 days.

(21) Appl. No.: 13/992,036

(22) PCT Filed: Dec. 1, 2011

(86) PCT No.: PCT/FR2011/052836
§ 371 (c)(1),
(2), (4) Date: Jun. 6, 2013

(87) PCT Pub. No.: WO2012/076786
PCT Pub. Date: Jun. 14, 2012

(65) Prior Publication Data
US 2013/0259782 A1 Oct. 3, 2013

(30) Foreign Application Priority Data

Dec. 8, 2010 (FR) ...................................... 10 60250

(51) Int. Cl.
*B01D 53/04* (2006.01)
*B01D 53/047* (2006.01)
(Continued)

(52) U.S. Cl.
CPC ........ *B01D 53/047* (2013.01); *B01D 2253/108* (2013.01); *B01D 2253/20* (2013.01); *B01D 2253/102* (2013.01); *B01D 53/0407* (2013.01); *B01D 53/002* (2013.01); *B01D 53/77* (2013.01);
(Continued)

(58) Field of Classification Search
CPC .. B01D 53/04; B01D 53/0407; B01D 53/047; B01D 2253/102; B01D 2253/108; B01D 2253/20; B01D 2257/502; B01D 2257/504; B01D 2256/22; B01D 2258/025; B01D 2259/40092; Y02C 10/08
USPC ............ 95/96, 139, 140; 96/108, 121; 62/617
See application file for complete search history.

(56) References Cited

U.S. PATENT DOCUMENTS 6,045,602 A * 4/2000 Shah et al. ...................... 75/466
6,214,084 B1 * 4/2001 Saxena et al. ................... 75/453
(Continued)

FOREIGN PATENT DOCUMENTS

FR 2848123 A1 6/2004
WO 2006106253 A2 10/2006

OTHER PUBLICATIONS

PCT/FR2011/052836, International Search Report, Mar. 7, 2012.

*Primary Examiner* — Frank Lawrence
(74) *Attorney, Agent, or Firm* — Elwood L. Haynes

(57) ABSTRACT

The present invention relates to a process and apparatus for producing a fluid enriched in carbon dioxide starting from a waste gas from a ferrous metallurgy unit.

15 Claims, 3 Drawing Sheets

(51) Int. Cl.
  *B01D 53/00* (2006.01)
  *C01B 31/20* (2006.01)
  *C21B 5/06* (2006.01)
  *F25J 3/02* (2006.01)
  *B01D 53/62* (2006.01)
  *B01D 53/77* (2006.01)

(52) U.S. Cl.
  CPC ....... *B01D 2256/20* (2013.01); *B01D 2257/504* (2013.01); *B01D 2258/025* (2013.01); *B01D 2259/40001* (2013.01); *B01D 2259/416* (2013.01); *C01B 31/20* (2013.01); *C21B 5/06* (2013.01); *C21B 2100/02* (2013.01); *C21B 2100/04* (2013.01); *Y02C 10/08* (2013.01); *Y02C 10/12* (2013.01); *F25J 3/0223* (2013.01); *F25J 3/0266* (2013.01); *F25J 2205/40* (2013.01); *F25J 2205/64* (2013.01); *F25J 2210/04* (2013.01); *F25J 2215/04* (2013.01); *F25J 2220/82* (2013.01); *F25J 2230/30* (2013.01); *F25J 2240/40* (2013.01); *F25J 2245/02* (2013.01); *F25J 2280/02* (2013.01); *F25J 2290/62* (2013.01); *B01D 53/62* (2013.01); *Y02C 10/04* (2013.01)

(56) References Cited

U.S. PATENT DOCUMENTS

| | | | |
|---|---|---|---|
| 8,709,128 B2 * | 4/2014 | Knop et al. | 75/392 |
| 2003/0047037 A1 | 3/2003 | Sethna et al. | |
| 2010/0146982 A1 * | 6/2010 | Lanyi et al. | 60/772 |
| 2012/0125157 A1 * | 5/2012 | Duarte-Escareno et al. | 75/392 |
| 2014/0230606 A1 * | 8/2014 | Traversac et al. | 75/488 |

* cited by examiner

_US 9,034,080 B2_

METHOD AND DEVICE FOR PRODUCING A FLUID ENRICHED WITH CARBON DIOXIDE FROM A WASTE GAS OF A FERROUS-METALLURGY UNIT

CROSS-REFERENCE TO RELATED APPLICATIONS

This application is a §371 of International PCT Application PCT/EP2011/052836 filed Dec. 1, 2011, which claims §119 (a) foreign priority to French patent application 1060250, filed Dec. 8, 2010.

FIELD OF THE INVENTION

The present invention relates to a process and appliance for producing a fluid enriched in carbon dioxide starting from a waste gas from a ferrous metallurgy unit, for example a waste gas from a blast furnace or from a Midrex, DRI or Corex® appliance.

BACKGROUND

This invention overcomes the failings of the processes of the prior art and in particular contributes to:
 reducing emissions enriched in carbon monoxide
 reducing the consumption of coke for the blast furnace
 increasing the productivity of the blast furnace
 simplifying the rotating machines of the appliance
 facilitating regulation
 preventing a deterioration in the energy consumption
for a process for capturing $CO_2$ on a ferrous metallurgy unit, optionally with recycling.

As the compressor upstream of the adsorption unit operates at a substantially constant compression ratio, if the pressure of the waste gas from the ferrous metallurgy unit varies, this results in a reduction in pressure upstream of the adsorption unit. The process according to the invention makes it possible for the adsorption unit to be able to accept these different inlet pressures with a good intrinsic output for the CO and an overall output for CO of approximately 100%, by virtue in particular of the recycling gas.

The fluid enriched in carbon dioxide comprises, for example, at least 70 mol % of carbon dioxide and can be in the gaseous or liquid form.

It is known, from WO-A-2006/106253, to use an adsorption process, followed by a process for purification by distillation, to produce a gas enriched in carbon dioxide and a waste gas enriched in carbon monoxide.

FR-2 848 123 describes a process for the separation of a waste gas from a ferrous metallurgy unit by washing with amines. The processes for washing with amines cannot function with a feed flow of variable pressure.

US2003/0047037 describes a process for the separation of a waste gas from a ferrous metallurgy unit by adsorption, using a purging gas which is natural gas and producing solely flows intended to be mixed with natural gas and sent to the ferrous metallurgy unit.

The invention provides for the recycling of a portion or all of the decarbonated gas enriched in carbon monoxide originating from the blast furnace. This process makes it possible specifically to reduce consumptions of coke per tonne of cast iron but also offers the advantage of increasing the productivity of the blast furnace.

The waste gas originating from the blast furnace has a pressure which can vary as a function of the charging rate of the plant. These variations are typically greater than 1 bar, which is not acceptable by current technologies for commercial machines while maintaining a constant discharge pressure towards the PSA. It should be noted that the pressure of the blast furnace and the molar flow of the waste gas vary substantially proportionally, resulting in a virtually constant flow by volume at the suction of the machine for compressing the blast furnace gas.

SUMMARY OF THE INVENTION

According to the invention, the pressure of the waste gas received by the adsorption unit is thus allowed to vary. The adsorption unit is designed to separate a gas at a first pressure but can also operate with a reduced output at a second pressure lower by at least 2 bar than the first pressure.

According to a subject matter of the invention, provision is made for a process for the production of a fluid enriched in carbon dioxide starting from a waste gas from a ferrous metallurgy unit comprising carbon dioxide and carbon monoxide, in which at least a portion of the waste gas is compressed in a first compressor, the compressed waste gas is optionally dried, the waste gas, optionally dried, is separated by an adsorption process in an adsorption unit to produce a gas enriched in carbon dioxide and depleted in carbon monoxide and a gas depleted in carbon dioxide and enriched in carbon monoxide, the gas enriched in carbon dioxide is separated in a separation unit, to produce a fluid enriched in carbon dioxide and a recycling gas comprising carbon monoxide, the fluid enriched in carbon dioxide is exited as product, the recycling gas is recycled from the separation unit to the adsorption unit at the inlet pressure of the adsorption unit and at least a portion of the gas depleted in carbon dioxide is sent to the ferrous metallurgy unit or another ferrous metallurgy unit, preferably after having reheated it.

According to other optional subject matters:
 during a first operation, the waste gas compressed in the first compressor has a first pressure at the outlet of the compressor of between 8 and 15 bar abs, a first flow rate and a first concentration of carbon monoxide and, during a second operation, the waste gas compressed in the first compressor has a second pressure at the outlet of the compressor of between 3 and 7 bar abs, a second flow rate which is less than the first flow rate and a second concentration of carbon monoxide which is less than the first concentration,
 at least a portion of the recycling gas is recycled to the adsorption unit at a pressure substantially equal to that of the discharge of the first compressor, in order to be separated in the adsorption unit,
 the gas enriched in carbon dioxide is compressed in a second compressor upstream of the separation unit or the recycling gas is compressed between the separation unit and the adsorption unit,
 the separation unit operates at a temperature below 0° C. via at least one cooling stage, followed by at least one phase separation stage, which can, for example, be a distillation unit,
 the first and/or the second pressure is/are held substantially constant by adjusting the outlet pressure of the first compressor, for example by means of a blower connected upstream of the latter,
 the outlet pressure of the first compressor is adjusted by sending the waste gas into a storage facility upstream of the first compressor and by feeding the first compressor from the storage facility, the pressure of the recycling gas is modified in order for it to be at a higher pressure during the first operation and a lower pressure during the second operation, the adsorption unit has a first carbon monoxide separation output during the first operation and a second carbon monoxide separation output during the second operation, lower than the first output, the waste gas exits from the ferrous metallurgy unit with a variable pressure, the at least a portion of the gas depleted in carbon dioxide to the ferrous metallurgy unit or another ferrous metallurgy unit, without having mixed it with another fluid, the recycling gas is mixed with the waste gas, optionally dried, upstream of the adsorption unit, According to another subject matter of the invention, provision is made for an appliance for the production of a fluid enriched in carbon dioxide starting from a waste gas from a ferrous metallurgy unit comprising carbon dioxide and carbon monoxide, comprising:

i) a ferrous metallurgy unit,
ii) a first compressor in which at least a portion of the waste gas originating from the ferrous metallurgy unit is compressed,
iii) an adsorption unit where the waste gas, optionally dried, is separated by an adsorption process to produce a gas enriched in carbon dioxide and depleted in carbon monoxide and a gas depleted in carbon dioxide and enriched in carbon monoxide,
iv) a separation unit where separation is carried out in the gas enriched in carbon dioxide, to produce a fluid enriched in carbon dioxide and a recycling gas comprising carbon monoxide, and means for exiting the fluid rich in carbon dioxide as product from the appliance,
v) a pipe for sending the recycling gas from the separation unit to the adsorption unit, and
vi) a pipe for sending at least a portion of the gas depleted in carbon dioxide to the ferrous metallurgy unit or another ferrous metallurgy unit.

The separation unit can be a unit for washing with a physical or chemical solvent or a unit for separation by cooling and separation of phases, for example a distillation unit operating at a temperature below 0° C.

Means are optionally provided for modifying the pressure of the recycling gas in order for it to be substantially equal to that of the inlet of the adsorption unit.

The separation unit can be a unit for separation at a temperature below 0° C.

The appliance can comprise means for smoothing out the variations in pressure of the waste gas upstream of the adsorption unit.

Two pressures are substantially equal if they differ by at most 0.5 bar.

DETAILED DESCRIPTION OF THE INVENTION

The invention will be described in more detail with reference to the figures, which represent processes according to the invention.

A fluid rich in $CO_2$ can comprise at least 30 mol % of carbon dioxide or at least 50 mol % of carbon dioxide.

Figure 1:
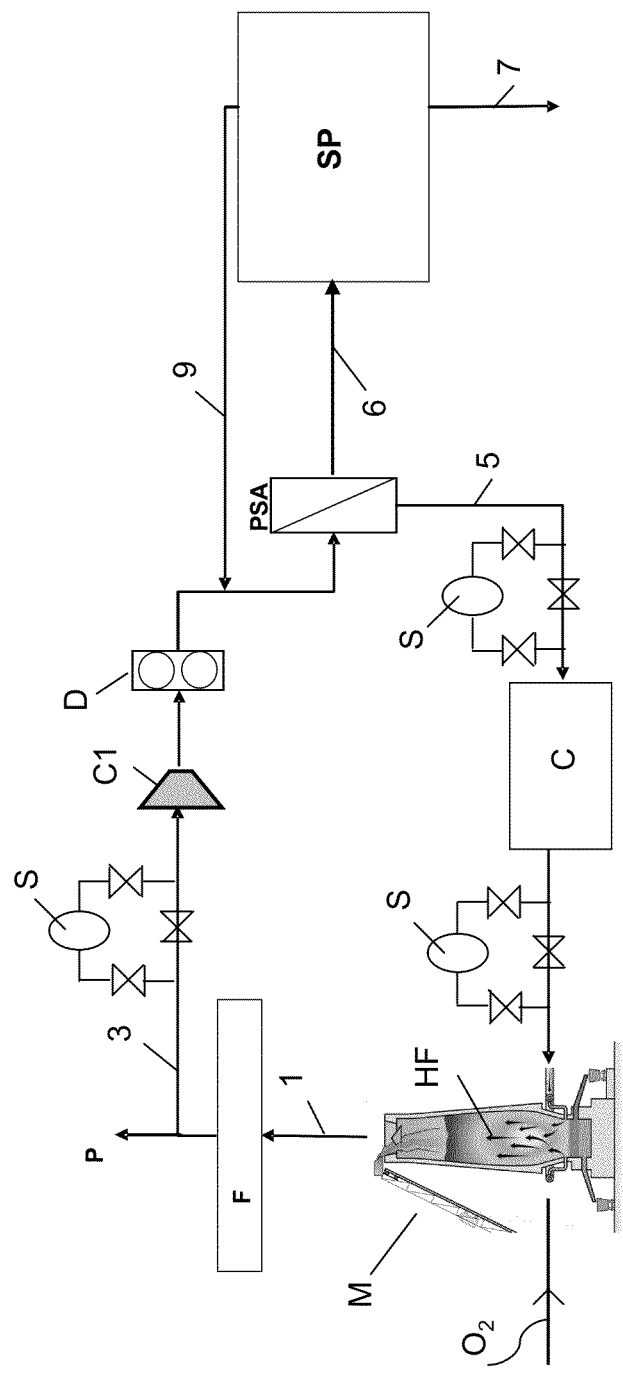
FIG. 1 represents a ferrous metallurgy unit integrated with an apparatus for the production of a fluid rich in CO2 in accordance with the present invention.

FIG. 1 represents a ferrous metallurgy unit, for example a Midrex, DRI or Corex appliance or a blast furnace, integrated with an appliance for the production of a fluid rich in $CO_2$. In the case illustrated of a blast furnace, the blast furnace is fed with oxygen and pulverized carbon and iron ore M, and also coke. The unit produces a waste gas 1 in an amount which can vary according to the charge of the unit.

The appliance for the production of a fluid rich in $CO_2$ comprises a PSA adsorption unit which can be of the PSA, VSA or VPSA type and a separation unit SP. The separation unit can be a unit for separation by washing by a physical or chemical solvent, for example washing with amines or MDEA. Alternatively, the separation in the SP unit can be carried out by purification at a temperature below ambient (below 0° C.) where at least one cooling stage is carried out, followed by at least one phase separation stage. The SP can, for example, be a distillation column preceded by a heat exchanger and optionally a compressor C2, illustrated in other figures.

The ferrous metallurgy unit, for example a blast furnace HF, produces a waste gas 1 comprising hydrogen, nitrogen, carbon dioxide, water vapor and, as main component, carbon monoxide.

After filtration in the filter F, a portion P of the gas is purged and the remainder 3 is compressed in a compressor C1 to a pressure. Subsequently, the compressed gas is dried in the dryer D and sent upstream of the adsorption unit. The unit produces a flow 6 enriched in carbon dioxide and depleted in carbon monoxide and a flow 5 depleted in carbon dioxide and enriched in carbon monoxide. The flow 6 is sent, after compression in the compressor C2, to a unit SP which can comprise a distillation column or a liquefier for producing a fluid enriched, indeed even rich, in $CO_2$ 7, for example liquid $CO_2$. The presence of the compressor C2 is nevertheless optional. The flow 9 is a waste gas comprising carbon monoxide which is sent back to the inlet of the PSA unit. In the absence of the compressor C2 or even if this compressor is present, it is possible to envisage compressing the flow 9 upstream of the purification by adsorption in order to achieve the pressure of the flow 3.

The flow 5 enriched in carbon monoxide is heated in the heat exchanger C, preferably of Cowper's type, and sent to the blast furnace HF in order to act as fuel.

According to a preferred alternative form, during a first operation, that of the nominal operation, the blast furnace produces gas at a first low pressure which is compressed by the compressor C1 to between 8 and 10 bar abs. The compressed flow has a first flow rate and comprises 45 mol % of carbon monoxide. It is purified in the PSA unit and the flow produced, enriched in carbon monoxide with respect to the first flow, is sent to the blast furnace. The waste flow 9 is recycled from the SP, as explained for the general example.

In the case of reduced charging of the blast furnace, during a second operation, the pressure of the gas 1 falls to a lower pressure than the first low pressure, its flow is reduced by half and the concentration of carbon monoxide is reduced to 40 mol %. The appliance continues to function. As the compression ratio of the compressor C1 is substantially constant, the gas at the inlet of the PSA is at between 3 and 7 bar abs. In this case, the functioning of the PSA unit deteriorates, more carbon monoxide remains in the flow 6 than for the example at higher pressure and the carbon monoxide output for the flow 5 would fall, if the recycling 9 did not add back the remaining CO. The flow 6, richer in CO than for the preceding case, is treated in the SP and substantially all the CO which it contains is found in the flow 9.

In order to take into account these different operations, it will be necessary to produce the flow 9 at a higher pressure for the first operation than for the second operation. For this, it is possible either, on the one hand, to compress the flow 6 to a higher pressure during the first operation or to compress the flow 9 to a higher pressure during the first operation or, on the other hand, to reduce the gas 6 or 9 in pressure during the second operation.

Apart from these main modifications in pressures which are between a range of 3 and 7 bar and a range of 8 and 10 bar, the pressure of the flow 3 can also be subjected to small rapid variations of less than 1 bar which can disrupt the functioning of the PSA purification appliance.

With the aim of reducing these small variations, the compression ratio of the compressor C1 can be variable. Additionally or alternatively, a blower B can be added upstream of the compressor C1. Another possibility, illustrated in the figure, consists in installing a storage facility S which receives gas 3 and acts to adjust the inlet pressure/flow rate of the compressor C1, in order to act as buffering facility.

The optional presence of buffering facilities S upstream and downstream of the Cowper's heater C, in order to take into account the variations in flow rate and/or in pressure, is also noted.

Figure 2:
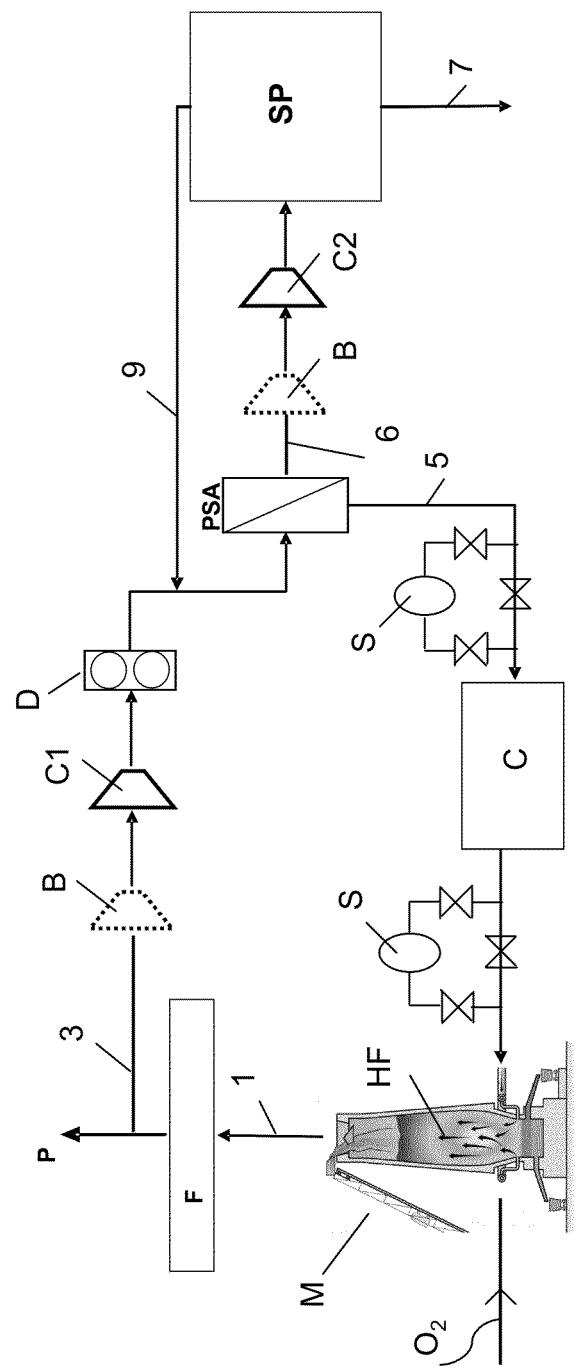
FIG. 2 represent another embodiment of the present invention.

For FIG. 2, blowers B can be added upstream of the compressor C1 and upstream of the compressor C2.

Figure 3:
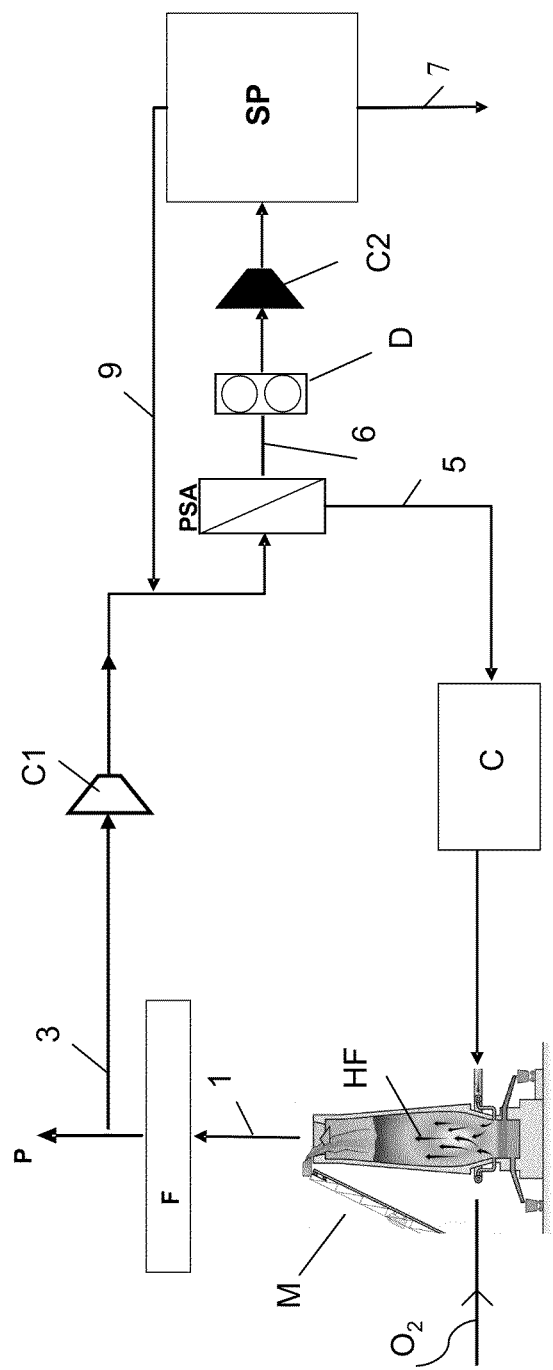
FIG. 3 represents another embodiment of the present invention.

For FIG. 3, the dryer D is no longer upstream of the compressor C1 but upstream of the compressor C2. This alternative form can be applied to all the figures.

Thus, due to recycling, it remains possible to carry out the process at these low pressures generated by the reduced charging of the blast furnace.

It will possibly be necessary to modify the cycle (time and pressure of the phases) between the first operation and the second operation.

The gas depleted in carbon dioxide 5 can optionally be sent to a ferrous metallurgy unit other than that from which the waste gas 1 originates.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the production of a fluid enriched in carbon dioxide starting from a waste gas from a ferrous metallurgy unit (HF) comprising carbon dioxide and carbon monoxide, the process comprising;
    compressing at least a portion of the waste gas in a first compressor,
    drying the compressed waste gas,
    separating the dried waste gas by an adsorption process in an adsorption unit to produce a first gas gas enriched in carbon dioxide and depleted in carbon monoxide and a second gas depleted in carbon dioxide and enriched in carbon monoxide,
    separating the first gas in a separation unit, to produce a fluid enriched in carbon dioxide and a recycling gas comprising carbon monoxide,
    removing the fluid enriched in carbon dioxide as product,
    recycling the recycling gas from the separation unit to the adsorption unit at the inlet pressure of the adsorption unit and
    sending at least a portion of the gas depleted in carbon dioxide to the ferrous metallurgy unit or another ferrous metallurgy unit.

2. The process of claim 1, wherein
    during a first operation, the waste gas compressed in the first compressor has a first pressure at the outlet of the compressor of between 8 and 15 bar abs, a first flow rate and a first concentration of carbon monoxide, and
    during a second operation, the waste gas compressed in the first compressor has a second pressure at the outlet of the compressor of between 3 and 7 bar abs, a second flow rate which is less than the first flow rate and a second concentration of carbon monoxide which is less than the first concentration.

3. The process of claim 1, wherein at least a portion of the recycling gas is recycled to the adsorption unit at a pressure substantially equal to that of the discharge of the first compressor, in order to be separated in the adsorption unit.

4. The process of claim 3, in which the first gas is compressed in a second compressor upstream of the separation unit or the recycling gas is compressed between the separation unit and the adsorption unit.

5. The process of claim 1, wherein the separation unit operates at a temperature below 0° C. via at least one cooling stage, followed by at least one phase separation stage.

6. The process of claim 2, in which the first and/or the second pressure is/are held substantially constant by adjusting the outlet pressure of the first compressor.

7. The process of claim 6, wherein the outlet pressure of the first compressor is adjusted by sending the waste gas into a storage facility upstream of the first compressor and by feeding the first compressor from the storage facility.

8. The process of claim 2, wherein the pressure of the recycling gas is modified in order for it to be at a higher pressure during the first operation and a lower pressure during the second operation.

9. The process of claim 1, wherein the adsorption unit has a first carbon monoxide separation output during the first operation and a second carbon monoxide separation output during the second operation, lower than the first output.

10. The process of claim 1, wherein the waste gas exits from the ferrous metallurgy unit with a variable pressure.

11. The process of claim 1, wherein at least a portion of the second gas is sent to the ferrous metallurgy unit or another ferrous metallurgy unit, without having mixed it with another fluid.

12. The process of claim 1, wherein the recycling gas is mixed with the waste gas.

13. An apparatus for the production of a fluid enriched in carbon dioxide starting from a waste gas from a ferrous metallurgy unit comprising carbon dioxide and carbon monoxide, comprising:
    i) a ferrous metallurgy unit,
    ii) a first compressor in which at least a portion of the waste gas originating from the ferrous metallurgy unit is compressed,
    iii) an adsorption unit where a dried waste gas is separated by an adsorption process to produce a first gas enriched in carbon dioxide and depleted in carbon monoxide and a second gas depleted in carbon dioxide and enriched in carbon monoxide,
    iv) a separation unit where separation is carried out in the first gas, to produce a fluid enriched in carbon dioxide and a recycling gas comprising carbon monoxide, and means for exiting the fluid rich in carbon dioxide as product from the appliance,
v) a pipe for sending the recycling gas from the separation unit to the adsorption unit, and
vi) a pipe for sending at least a portion of the gas depleted in carbon dioxide to the ferrous metallurgy unit or another ferrous metallurgy unit.

14. The apparatus of claim 13, wherein the separation unit is a unit for separation at a temperature below 0° C.

15. The apparatus of claim 13, further comprising means for smoothing out the variations in pressure of the waste gas upstream of the adsorption unit.

\* \* \* \* \*